Patented Feb. 20, 1934

1,947,563

UNITED STATES PATENT OFFICE 1,947,563

PROCESS FOR MANUFACTURING AND RECOVERING GLUTAMIC ACID AND ITS COMPOUNDS

Reisuke Masuda and Celestian L. Royal, Toledo, Ohio, and Albert E. Marshall, New York, N. Y., assignors to The Larrowe-Suzuki Company, Rossford, Ohio, a corporation of Ohio No Drawing. Application April 29, 1931
Serial No. 533,790

13 Claims. (Cl. 260—119)

This invention relates generally to novel processes of manufacturing and recovering a d-glutamic acid compound (including glutamic acid, its hydrochloride, and other salts) from readily available raw materials and in a relatively high state of purity.

A general object of the invention is to provide novel processes of manufacturing a d-glutamic acid compound from glutamic mother substances by a simple treatment, and in a convenient, efficient and economical manner.

Further and more particular objects of the invention are to provide a process of manufacturing d-glutamic acid by controlled alkaline hydrolysis of glutamic mother substances, and to provide novel and efficient methods of recovering the d-glutamic acid in a relatively high state of purity from either alkaline or acid hydrolysis liquors.

Other objects of the invention will in part be obvious and will in part appear hereinafter.

The invention accordingly comprises the several steps and the relation of one or more of such steps with respect to each of the others which are exemplified in the following detailed disclosure, and the scope of the application of which will be indicated in the claims.

The present process contemplates the utilization of any suitable raw material from which glutamic acid may be prepared by hydrolysis. This class of raw materials will be referred to herein as "glutamic mother substances", and includes materials from which glutamic acid may be formed, such as vegetable proteins, wheat gluten, animal proteins, casein, and the like as well as the more impure materials, such as beet molasses, molasses residues such as distillery slops, and desaccharified beet molasses, for example, Steffen's waste water.

A preferred embodiment of the present invention contemplates a controlled alkaline hydrolysis of glutamic mother substances, by means of, for example, alkali metal hydroxides, such as sodium or potassium hydroxide, although fairly good results can with care also be obtained by controlled hydrolysis by means of ammonium hydroxide or the alkaline earth metal oxides or hydroxides, such as, for example, lime.

Alkaline hydrolysis has heretofore been deemed to be commercially impracticable, because the resulting product contained l-glutamic acid, but we have found that if the conditions, concentrations and time of treatment are carefully controlled as hereinafter set forth, such hydrolysis can be readily carried out without converting the desired dextro form of glutamic acid to the undesired laevo or racemized compound form; and that when using impure glutamic mother substances, such as beet molasses residues, it is unnecessary first to remove the inorganic material (principally salts of potassium and sodium) from the raw material prior to hydrolysis in order to prevent their crystallization with glutamic acid, as is the case when acid hydrolysis is utilized.

As a specific example of a preferred process utilizing the principles of the present invention, the following is given; the various steps being designated by numbers for convenience of identification:

(1) Steffen's waste water is first concentrated to a specific gravity of about 1.34 or higher, and sodium hydroxide is added thereto either as a solid or in aqueous solution, as the case may be, until the mix has a specific gravity of approximately 1.34 and an alkalinity (expressed as NaOH) of about 3% to 7% (preferably 6% to 7%) by weight. The temperature of the mix should not exceed 100° C., and preferably should be kept at about 60° C.

(2) The mixture is then heated in an autoclave, indirectly through a jacket or directly by injection of live steam, or both, for about 2¼ hours at a temperature of from 80°–100° C., (preferably 85°–95° C.), and is then promptly cooled to prevent racemization of the d-glutamic acid compounds. As will be apparent to one skilled in the art, the use of an autoclave at these temperatures is not necessary, but we have found such use desirable in treating Steffen's waste water as a means of improving control and in order to prevent the evolution of undesirable odors. These collateral problems can, of course, be taken care of by other means if desired. The progress of the hydrolysis is indicated by an increase in the amino nitrogen content of the solution, for example, a waste water with an original amino nitrogen content of 0.86% will have 1.85% to 1.88% amino nitrogen content at the end of the hydrolysis period.

(3) Concentrated aqueous hydrochloric acid (or HCl gas) is then added until the solution has a titratable acidity against litmus of about 2.5% to 4.5% (preferably 3.5%) (expressed as HCl), which, with ordinary Steffen's waste water, corresponds to a pH of about 4.5.

(4) The solution is then evaporated preferably under vacuum until it has a specific gravity of about 1.48 at 65° C.

(5) Concentrated aqueous hydrochloric acid (or HCl gas) is again added, until the pH is 2.1.

The resulting composition is of a concentration short of the point at which glutamic acid hydrochloride will crystallize out.

(6) The liquid is then cooled and allowed to stand until the inorganic salts crystallize out, and they are removed as by centrifuging.

(7) To the filtrate is added strong sodium hydroxide solution, or, preferably, ammonia gas (NH₃), until the pH is 3.2, which is the isoelectric point of glutamic acid. The solution is then allowed to cool and to stand for several days during which time the glutamic acid crystallizes out, and is removed by filtration; the crystalline product containing about 90% d-glutamic acid.

(8) The solid and liquid residues of steps 6 and 7 may be treated for the recovery of materials of value as fertilizer.

It is to be understood, however, that the above example is not by way of limitation of the invention although the directions given therein are in general applicable to the treatment of any glutamic mother substance; and that obviously when relatively pure glutamic mother substances are used, step 6 is omitted and the total amount of acid necessary to give the desired pH will be slightly different.

The use of ammonia gas (NH₃) as a neutralizing agent in step 7 is preferred, particularly since thereby undesirable dilution of the concentrated solution is avoided because the required accuracy of neutralization cannot be accomplished with other alkaline substances unless they are added in dissolved condition. Also the ammonium salt thus formed is more soluble than the corresponding salts of the alkali metals per se and does not tend to crystallize out and contaminate the d-glutamic acid. The nitrogen added in the form of NH₃ increases the value of the liquid residue for fertilizer purposes. For all of these reasons, such use of ammonia is important and valuable, not only in the case of alkaline hydrolysis, but also in processes utilizing acid hydrolysis of glutamic raw materials as well as in the purification of impure glutamic acid compounds, regardless of their origin. In the purification last mentioned as well as in the treatment of relatively pure glutamic mother substances the concentration at the end of step 5 may more closely approach the point of crystallization of glutamic acid hydrochloride than when treating impure mother substances such as molasses slops.

While a detailed theoretical explanation of the exact reactions occurring during the above described treatments is impossible because of the complexity of the materials involved, it at present appears that in step 2 the glutamic mother substance is converted into glutamic acid, which then in large part is converted into sodium glutamate; the addition of hydrochloric acid in step 3 avoids precipitation in step 4, particularly in that it keeps the glutamic acid compounds in a stable form; in step 5 the addition of hydrochloric acid is sufficient to result in the conversion of the sodium glutamate into glutamic acid hydrochloride, rather than into glutamic acid, thus preventing losses of glutamic acid through crystallization thereof along with the inorganic salts.

Although, as indicated, in the preferred form of process, d-glumatic acid per se is recovered, it is within the perview of the invention that if desired d-glutamic acid hydrochloride may be recovered instead; in which case, in lieu of step 7 as given in the above specific example, the filtrate from step 6 is saturated with hydrochloric acid gas, and the saturated solution is allowed to stand until the d-glutamic acid hydrochloride crystallizes out. In this form of process also, the product recovered in the first instance is found to be in a much higher state of purity than the heretofore known processes.

It will thus be seen that by means of the present invention there has been provided a process by which a d-glutamic acid compound can be conveniently, efficiently and economically produced from a variety of raw materials by a series of correlated and carefully controlled steps, and since certain changes in carrying out the above process may be made without departing from its scope, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Particularly it is to be understood that in said claims, ingredients or compounds recited in the singular are intended to include compatible mixtures of such ingredients wherever the sense permits.

Having described our invention, what we claim as new and desire to secure by Letters Patent, is:

1. In a process of manufacturing a d-glutamic acid compound from raw materials capable of yielding glutamic acid by hydrolysis, the steps which comprise hydrolyzing a glutamic mother substance in an alkaline solution having an alkalinity of from 3% to 7% expressed as NaOH at a temperature and for a time sufficient to convert the glutamic mother substance into glutamate.

2. In a process of manufacturing a d-glutamic acid compound from raw materials capable of yielding glutamic acid by hydrolysis, the steps which comprise hydrolyzing a glutamic mother substance in an alkaline solution having an alkalinity of about 3% to 7% expressed as NaOH at a temperature and for a time sufficient to convert the glutamic mother substance into a glutamate, and then cooling the mass to prevent racemization of the d-glutamic compounds.

3. In a process of manufacturing a d-glutamic acid compound from raw materials capable of yielding glutamic acid by hydrolysis, the steps which comprise treating a glutamic mother substance in an alkali solution having an alkalinity of about 3% to 7% expressed as NaOH at a temperature and for a time sufficient to convert the glutamic mother substance into a glutamate, and then cooling the mass to prevent racemization of the d-glutamic compounds.

4. In a process of manufacturing a d-glutamic acid compound from raw materials capable of yielding glutamic acid by hydrolysis, the steps which comprise treating a glutamic mother substance with an alkali solution having an alkalinity of from 3% to 7% expressed as NaOH at a temperature of from 80°–100° C., and for a time sufficient to convert the glutamic mother substance into glutamate, and then cooling the mass to prevent racemization of the d-glutamic compounds.

5. In a process of manufacturing a d-glutamic acid compound from raw materials capable of yielding glutamic acid by hydrolysis, the steps which comprise heating a glutamic mother substance in a medium containing sodium hydroxide and having an alkalinity of about 3% to 7% at a temperature of from 80°–100° C., for a period of about two hours, and then cooling the mass to prevent racemization of the d-glutamic compounds.

6. In a process of manufacturing a d-glutamic acid compound from raw materials capable of yielding glutamic acid by hydrolysis, the steps which comprise heating a glutamic mother substance in an alkali solution having an alkalinity of about 6% to 7% expressed as NaOH at a temperature of between about 85° C. and about 95° C. for a period of about two hours, and then promptly cooling the mass to prevent racemization of the d-glutamic compounds.

7. In a process of manufacturing a d-glutamic acid compound from raw materials capable of yielding glutamic acid by hydrolysis, the steps which comprise preparing a concentrated solution of a d-glutamic acid compound and hydrochloric acid and having a pH of about 2.1, and adding ammonia thereto until a composition having a pH of about 3.2 is obtained.

8. In a process of manufacturing a d-glutamic acid compound from raw materials capable of yielding glutamic acid by hydrolysis, the step which comprises neutralizing a concentrated solution of a hydrolyzed glutamic mother substance of a specific gravity of about 1.4 and a pH of about 2.1 with ammonia gas until a composition having a pH of about 3.2 is obtained.

9. In a process of manufacturing d-glutamic acid, the steps which comprise preparing a concentrated solution of a hydrolyzed glutamic mother substance, adding hydrochloric acid until the pH is about 2.1, neutralizing with ammonia gas until the pH is 3.2, allowing the solution to cool and stand until the d-glutamic acid crystallizes out, and then separating the crystals therefrom.

10. A method of recovering d-glutamic acid from a crude glutamic material, which comprises converting said material into glutamic acid hydrochloride, concentrating to a point just short of the point at which the hydrochloride would crystallize upon cooling, neutralizing with ammonia gas to a pH of about 3.2, allowing the solution to cool and stand until the d-glutamic acid crystallizes out, and then separating the crystals therefrom.

11. A method of recovering d-glutamic acid from a crude glutamic material, which comprises treating said material with concentrated hydrochloric acid to convert the material into d-glutamic acid hydrochloride in the presence of hydrochloric acid, concentrating to a point just short of the point at which the hydrochloride would crystallize upon cooling, neutralizing with ammonia gas to a pH of about 3.2, allowing the solution to cool and stand until the d-glutamic acid crystallizes out, and then separating the crystals therefrom.

12. A process for the manufacture of d-glutamic acid which comprises treating a glutamic mother substance with an alkaline medium having an alkalinity of about 6% to 7% expressed as NaOH, heating to a temperature of about 80°-100° C., for a period of time sufficient to convert the glutamic mother substance into glutamate, cooling the reaction mixture, acidifying with hydrochloric acid to an acidity of about 2.5% to 4.5%, evaporating to a specific gravity of about 1.4, acidifying with concentrated hydrochloric acid until the reaction mixture has a pH of about 2.1, adding an alkali until a composition having a pH of 3.2 is obtained, and cooling and crystallizing out the d-glutamic acid.

13. A process for the manufacture of d-glutamic acid which comprises heating Steffen's waste water with sodium hydroxide in a solution having an alkalinity of about 6% to 7% at a temperature of about 85°-95° C., for a period of about two hours, promptly cooling the reaction mixture, adding hydrochloric acid thereto to give an acidity of about 3.5%, evaporating to a specific gravity of about 1.4, adding concentrated hydrochloric acid sufficient to give a pH of about 2.1, neutralizing with ammonia gas until a composition having a pH of about 3.2 is obtained, permitting the d-glutamic acid to crystallize, and separating said acid.

REISUKE MASUDA.
CELESTIAN L. ROYAL.
ALBERT E. MARSHALL.